United States Patent [19]
Coates et al.

[11] 3,842,272
[45] Oct. 15, 1974

[54] SCANNING CHARGED PARTICLE MICROPROBE WITH EXTERNAL SPURIOUS ELECTRIC FIELD EFFECT CORRECTION

[75] Inventors: Vincent John Coates, Los Altos; Leonard M. Welter, Saratoga; James J. Gold, Mountain View, all of Calif.

[73] Assignee: American Optical Corporation, Southbridge, Mass.

[22] Filed: July 24, 1973

[21] Appl. No.: 382,230

[52] U.S. Cl............... 250/311, 250/307, 250/310, 250/397
[51] Int. Cl...................... H01j 37/26, G01n 23/00
[58] Field of Search .......... 250/305, 306, 307, 309, 250/310, 311, 396, 397, 398, 399

[56] References Cited
UNITED STATES PATENTS
3,549,883   12/1970   Morris et al. ................ 250/310
3,678,333   7/1972   Coates et al. ................ 250/311

*Primary Examiner*—William F. Lindquist
*Attorney, Agent, or Firm*—H. R. Berkenstock, Jr.; William C. Nealon

[57] ABSTRACT

This invention relates to a scanning charged-particle microscope system, such as a scanning electron microscope system. More particularly, the invention relates to apparatus that is used in compensating for external interference with the charged particle beam.

10 Claims, 4 Drawing Figures

SCANNING CHARGED PARTICLE MICROPROBE WITH EXTERNAL SPURIOUS ELECTRIC FIELD EFFECT CORRECTION

BACKGROUND OF THE INVENTION

A problem which is solved by this invention relates to a form of visual distortion that is encountered in high-magnification use of a scanning charged particle microprobe, such as a scanning electron microscope. This distortion may be caused by time-repetitive electrical or magnetic fields, which cause unwanted deflection of the small charged particle beam within the microscope system. Such external influences naturally have a varying impact upon the system according to the strength and orientation of the field. For example, within a laboratory room wherein a scanning electron microscope system is being utilized, the energizing of a nearby soldering iron, or coffee pot, with 60 hertz line power, establishes 60 hertz electromagnetic fields within that laboratory room. Because of the sensitivity of this small electron probe to effects of these fields, the electron beam will be displaced from its intended path. In this example, combination of the "coffee pot field" and "soldering iron field" creates a resultant field. Other equipment within the room that may be temporarily energized will likewise contribute to the overall electromagnetic field within the room. Operation of such as these devices from the 60 hertz line, and the disposition of field influencing articles such as numbers of people in the room may also have an effect on the field interference of the beam. The total effect of this field on the probe may be compensated for by use of the invention of the instant application which incorporates periodic determination of the external electromagnetic field and a control of beam deflection during scan to overcome the distortion.

Prior art solutions of this distortion problem included shielding the electron probe from the spurious fields. Such an approach required large amounts of costly material, (e.g. Mu metal) as well as having other certain disadvantages. Another solution was to attempt to generate a large field-free region around the instrument. The large field-free region could be created by means such as Helmholtz coils which are recognized as incorporating bulky apparatus around the work area of the laboratory. These large coils created problems due to their size, cost, and generally unsatisfactory overall performance.

The solution to this existing spurious field and distortion problem that is presented by the invention of the instant application incorporates a waveform generator which is programmed to generate a negative or opposite signal which may be applied to the beam deflection scan control to counter-balance the probe deflection caused by the external offending fields. These correction signals are operated in synchronism with the external fields to achieve a nulling of all field-synchronized deflections of the probe, by adding the compensating signal output to the normal probe deflection signals.

The invention in a preferred form includes two waveform function generators which are arbitrarily selected to be synchronized to the 60 hertz power line supply of the instrument (such as via 60 hertz vertical scan sync pulses generated by the Synch/Scan Control in a scanning electron microscope). One function generator is designed to correct for one component of the distortion (vertical), and the other function generator is designed to correct for the other orthogonal component (horizontal). Each function generator is preferably manually programmable to provide a wave shape that is equal in amplitude and opposite in phase to the beam distortion caused by the external interference waveform. The described function generator is constructed of 24 potentiometers each connected to positive and negative source voltages. Each potentiometer may thus be adjusted to provide positive or negative output voltage within the source voltage limits on the wiper of each potentiometer. Each wiper is connected to the input of a multiplexing switch which operates in synchronism with the waveform. The resulting stepped voltage wave shape which is produced from sequential scan of the potentiometers, is smoothed through filter means and is supplied to beam deflection coil circuitry to correct for the error.

The programmed correction input is determined by first preventing one component of the electron probe deflection system from operating. With the vertical deflection system inoperative broad vertical bands are produced on the usual cathode ray tube visual output monitor. Since the beam is supposed to continuously rescan (in the absence of distortion) the same line, the distortion resulting from spurious fields will appear in the visual output as wiggles or curves to the otherwise straight vertical bands. By varying the voltage input to the beam deflection circuit by adjustment of the individual potentiometers, until all the wiggles are substantially eliminated, one can correct for the distortion. Next, the same procedure is followed with respect to the other orthogonal deflection system (to compensate for the "horizontal" interference).

The invention thus generates a functional waveform which "cancels" the spurious field effect on the scanning charged particle probe.

SUMMARY OF THE INVENTION

According to certain of the features of the invention, there is disclosed an improvement for a scanning charged particle microprobe system wherein a source of charged particles is directed as a collimated beam onto a specimen to be examined. The beam is caused to scan the specimen in a predetermined pattern (raster) and means are included which record the numbers of charged particles exiting the surface of the scanned specimen. The improvement herein disclosed includes means to determine the deflection of the beam at predetermined positions due to spurious external electrical and magnetic fields, means for generating beam scan correction signals complementary in effect to the spurious beam deflection, means for applying the beam correction signals to the beam scanning means.

It is thus an object of this invention to provide an improved scanning charged particle microprobe system.

It is a further object of this invention to provide a scanning microscope system which has a feature of beam perturbation compensation which is readily programmed into the system.

It is still another object of this invention to provide a beam perturbation compensator for use with a scanning microscope that has a feature of being readily adjusted to changing electrical or magnetic field environment.

DESCRIPTION OF A PREFERRED EMBODIMENT

Figure 1:
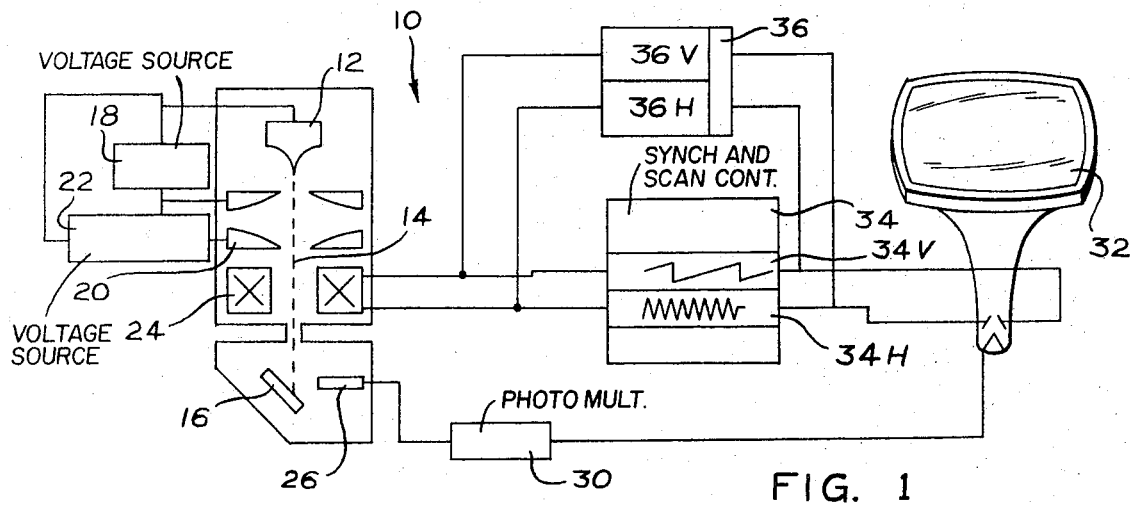
FIG. 1 is a schematic representation in block diagram form of a scanning electron microscope incorporating the invention.

Referring now to the drawings and specifically FIG. 1, reference numeral 10 indicates a scanning charged particle microprobe system, such as the field emission scanning electron microscope illustrated in greater detail in U.S. Pat. No. 3,678,333 commonly owned by the Assignee of this application. Generally, such a scanning microprobe system includes a field emission tip 12 which serves as a source of a bright beam of charged particles 14 which is focused into a spot on a specimen 16. In the illustrated embodiment tip 12 produces a beam of electrons when applied with a large negative potential, as by voltage means 18 while maintained under a large partial vacuum (e.g. $10^{-10}$ torr). The thus produced beam is focused by anode means 20 applied with suitable accelerating voltages from means 22, as discussed in the aforementioned patent.

The focused beam 14 is scanned by means of a deflection system and stigmator 24. Information about the specimen 16 is obtained by detecting charged particles liberated therefrom such as transmitted electrons, secondary electrons, reflected electrons, absorbed electrons, photons, x-rays, positive ions, etc., any or all of which are generated by the incident beam. Detector 26, such as a scintillation type device, is often used to detect the presence of one of the above-mentioned particles. Such a detector 26 converts the bombardment by particles into a light signal which is in turn converted (such as by a photomultiplier device 30) into an electrical signal. This electrical signal may be then used to modulate the intensity of a synchronously scanned display 32 (such as a cathode ray tube). Display 32 and stigmator 24 are conveniently driven by a sweep generator in Synch and Scan Control 34 having conventional horizontal 34h and vertical 34v sweep sections providing a synchronization of beam 14 movement on specimen 16 with the presentation on monitor 32. Stigmator 24 includes deflection coils, (not shown and well known in the art) which render beam 14 controllable in orthogonal directions along the specimen surface, one coil being designated a vertical coil and driven by sweep 34v. The other of said coils is designated a horizontal coil and driven by sweep 34h.

As previously discussed, the usual distortion problems are generated by the common power system — being thus of constant frequency, and directly correctable. The illustrated embodiment is adapted for 60 hertz correction and thus utilization in a 60 hertz power supply installation such as is prevalent in the United States. Such direct correction for fixed frequency (e.g. 60 hertz) distortion is applied by function generators 36v and 36h, which are synchronized to the master Synch and Scan Control 34. Expectedly, if the fixed frequency distortion to be corrected for was at other than at the main power supply frequency, a separate frequency source would be required for function generator 36.

Figure 2:
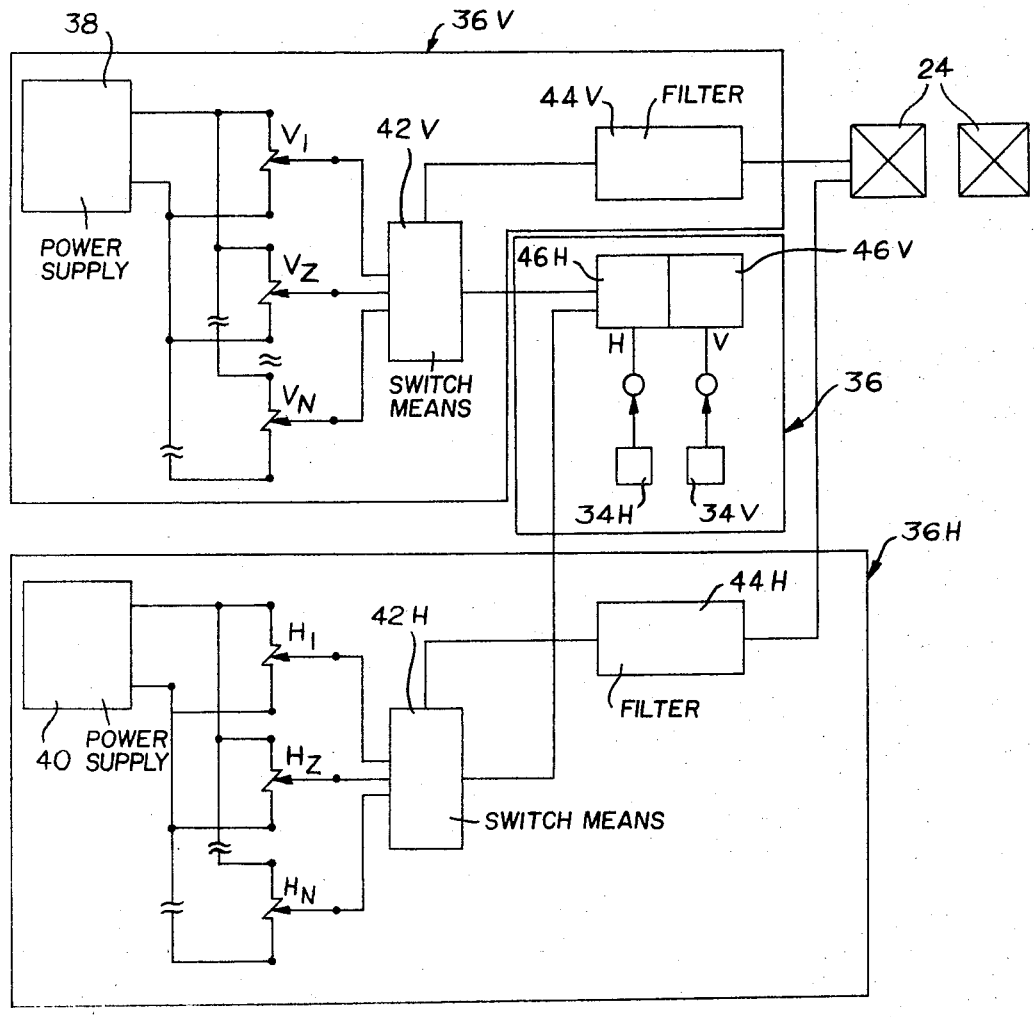
FIG. 2 is a schematic representation in block diagram form of the function generators according to the invention.

Referring now to FIG. 2, function generator 36 including vertical and horizontal sections 36v and 36h are shown in greater detail. Each generator includes a bank of individually adjustable voltage sources, $v_1, v_2 \ldots v_n$ for vertical generator 36v and $h_1, h_2 \ldots h_n$ for horizontal generator 36h. As illustrated voltage sources $v_n$ and $h_n$ are variable potentiometers driven by a power supply 38, 40, which may be common to both, thus each $v_n$, $h_n$ may supply an individually selectable correction voltage. Voltage sources $v_n$ and $h_n$ are respectively connected (individually) to the vertical and horizontal coils of stigmator 24 through switching means 42v and 42h and filter means 44v and 44h.

Switching means 42v and 42h are controlled through means 46v and 46h which are responsive to Synch and Scan Control 34 for beam 14 and monitor 32. Means 46v and 46h cause switch means 42v and 42h to be recycled according to the frequency of the distortion to be corrected for. Thus, for each cycle of interfering field frequency, a finite correction may be applied to the beam sweep, each of the individual finite corrections being applied for a period $1/n$ of the total cycle of the distorting frequency.

Figure 3:
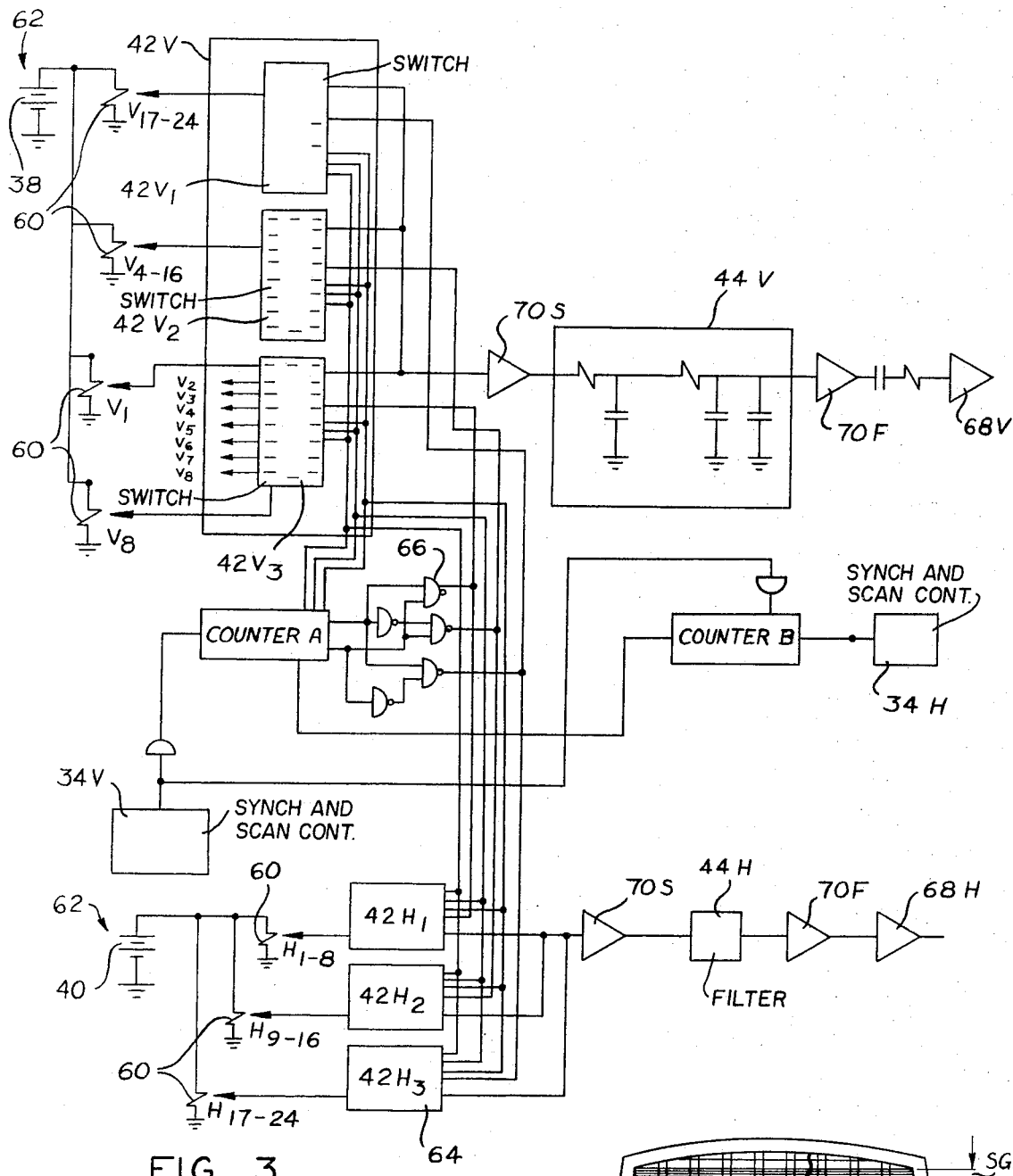
FIG. 3 is a schematic representation of a preferred form of the function generator of FIG. 2.

In the instant embodiment, for 60 hertz distortion correction, the full correction will be applied every 1/60th of a second, since, in the preferred form illustrated the voltage applying means (switch means 42) are re-cycled by Control 34, (FIG. 3). Since 24 individual voltage correctors ($v_n$, $v_h$) are used in the preferred embodiment later described, 24 segmental corrections are applied to the horizontal and vertical scan of the beam 14. The specific mode chosen to accomplish the distortion correction is described and illustrated below.

Figure 4:
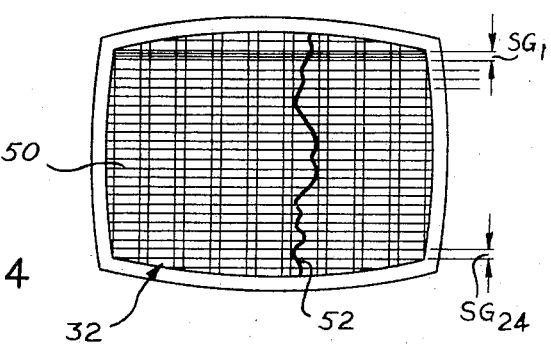
FIG. 4 is a pictorial view of a scanning electron microscope monitor illustrating a correction to be made by the invention.

The embodiment of the invention as incorporated into a scanning electron microscope of the type described in the aforementioned patent is illustrated in detail in FIG. 3. The effect of the correction applied by the circuit of FIG. 3 is illustrated in FIG. 4. Briefly, FIG. 4 shows the face of monitor 32 and lines 50 represent the usual horizontal scan lines of a television type cathode ray tube monitor. The influence of external fields (electrical or magnetic) upon the beam 14 during operation is to cause the beam to deflect in the horizontal or vertical direction (usually both simultaneously). when the beam is thus deflected, the indicated position of the beam and the generated picture by the sweep of monitor 32 do not reflect the desired position of beam 14. FIG. 4 represents the nature of the horizontal distortion experienced from such fields in the vertical scan. In this instance, the vertical scan of the beam is disabled (as by turning off the input to vertical deflection coils from vertical sweep 34v). The horizontal scan causes the beam 14 to repeatedly track across the same line on a specimen in the horizontal direction, and the monitor 32 makes the full picture, not knowing the vertical scan of beam 14 is disabled. The monitor thus shows a single vertical line 52 representing a signal detected during the stationary horizontal scan of the beam 14. Assuming no horizontal distortion, line 52 would be straight since the beam 14, absent such distortion, should track a single straight path left to right on the specimen and give a repetitive signal at the same relative horizontal position, which would be displayed as the aforementioned straight vertical line 52 when spread vertically over monitor 32. The illustrated wavy line is the result of the beam's deflection in the horizontal due to the superimposed external field influence in a left to right direction as displayed from top to bottom of the specimen area examined.

The present invention corrects for the illustrated beam displacement by the interfering external field by generating a beam straightening signal to be applied to the appropriate deflection coils. It has been determined that it is not necessary to generate a correction signal for each horizontal sweep of the beam in the entire vertical raster. Rather, it is convenient to break down the approximately 1200 line raster of the illustrated SEM into groups such as 24 sections — illustrated as sweep groups $SG_{1-24}$ on monitor 32. Accordingly, a plus or minus (left or right) beam shift function is generated for each of these 24 sweep groups to correct the unwanted horizontal deflection by the distorting field. As each individual beam shift function is generated and applied to beam 14 as it traverses each of the sweep groups SG, the distorted line 52 is caused to be straightened. The following description of the circuitry of FIG. 3 illustrates how each sweep group SG beam function is determined and applied.

Each sweep group SG has as associated beam position corrector $v_n$, $h_n$ which conveniently is a potentiometer 60 supplied with a voltage power supply 62. Each individual beam distortion correction function for a sweep group is generated as a voltage on the appropriate potentiometer and applied to the beam sweep through switches 42h and 42v. In the illustrated embodiment, it is convenient to use semi-conductor multiplexing switch 64 such as the type 3705 available from such as Fairchild Semi-conductor Corporation, National Semiconductor Corporation or Siliconix. The chosen switch has 8 channel capacity and is coupled with two others to produce switching for the 24 individual potentiometers for each the horizontal and vertical function generators 36h and 36v. Each switch 64 is, in turn, coupled to 8 of the potentiometers 60. Logic circuitry 66, well known in the art, enables the switches to operate sequentially and, in turn, sequence each of the individual beam distortion correction functions to the appropriate deflection coil (in stigmator 24). The output of each switch 64 is, therefore, supplied to a drive amplifier 68 for the appropriate deflection coil. Since the output of potentiometers 60 is a step function for a sweep group, and abruptly shifts to the next sequenced potentiometer (e.g. $v_1$ and $v_2$, etc.) it is desirable to smooth the transition to approximate the complementary wave form of the line 52. Thus, filter 44 is included in the preferred circuitry of FIG. 3. Also, to isolate the operation of the various subcircuits (switch 42, filter 44, etc.) from each other, so as to not allow one to load down another, isolating amplifiers are included — such as amplifier $70_s$ for switch isolator and $70f$ for filter isolator.

Switches 42 are synchronized to Synch and Scan Control 34 to be sequenced through their individual programs every 1/60th of a second (for the 60 hertz correction system illustrated). Thus, each of the vertical and horizontal function generators 36v and 36h illustrated are initiated at the beginning of a sweep of specimen 16 and monitor 32. Counters A and B serve to couple the generators 36v and 36h to Control 34 and to sequence the individual switches for sweep group beam distortion correction. Counter A is connected to the vertical and horizontal Synch Controls (34v and 34h) and counts the sweep groups SG from 1 through 24 and appropriately selects switches $42v_{1-3}$ and $42h_{1-3}$ which, as previously mentioned, causes the individual beam distortion correction to be supplied to the appropriate deflector coils. Counter B is coupled to the horizontal Synch Control 34h and Counter A and counts horizontal sweeps to identify each sweep group supplying Counter A with this information, so that each group may then be sequenced.

Principal reference to beam correction has been with regard to the illustrated vertical function generator 36v illustrated in FIG. 3. The lower portion of the circuit of FIG. 3 represents horizontal function generators 36h, which is substantially a duplicate of 36v.

To determine the effect of vertical distortion, the beam 14 is driven vertically across the specimen with the vertical scan signal disabled and horizontal scan substituted. However, because of the selection of sweep groups in the vertical and the convenience of correction, the vertical is scaned at the horizontal sweep rate and is displayed horizontally (as before) on the monitor 32. Again, potentiometers 60h are adjusted to straighten out the distorted line 52 and upon achieving the correction the system is returned to normal operation with Counters A and B sequencing the individual horizontal and vertical beam distortion function for each sweep group traversed.

Since the correction of beam distortion is accomplished only in one of the orthogonal directions at a time, it may be necessary to repeat the vertical and horizontal function correction determination to remove possible effect of correction in one direction upon the other axis, or to correct for specimen topography effects.

It should be appreciated that distortion correction is keyed to the raster of monitor 32, and corrections made for groups of horizontal line sweeps (SG's). For convenience, it is assumed that horizontal deflection can be corrected unitarily for the full horizontal sweep of a group SG, since the duration of such sweep is both of short duration and short distance. If it were found that the assumptions failed for certain types of distortion, the horizontal sweep could be divided into scan groups and correction applied accordingly. It must be realized, however, that arbitrary group function generators (time or space generated) would have to be incorporated into the system to supplant the function of Counters A and B for the horizontal generator 36h. The correction circuitry is greatly simplified by taking advantage of the identifiability of each horizontal sweep in the vertical pattern and the ease of applying corrections accordingly.

Likewise, the number of groups SG can be set at any desirable number, including making a group for each line 50. Naturally, the assistance of a computer would facilitate storage of the individual functions to be generated and sequencing of the application of the individual beam distortion connections.

It is to be appreciated that the above-described invention may be embodied in other specific forms without departing from the spirit on basic characteristics thereof. The invention is applicable to any charged particle beam probe device, such as electron beam etching, writing, ion probe devices, etc. over and above the illustrated use in a scanning electron microscope. The described embodiments are, therefore, to be considered as illustrative and not limiting, and the scope of the invention indicated by the appended claims.

What is claimed is:

1. In a scanning charged particle microprobe system including a source of charged particles, means for collimating said particles into a beam, means for scanning said beam in a predetermined raster over a specimen in said microprobe system, detector means including means for generating a signal proportional to charged particles detected and recording means connected to said detector means to record detection of charged particles exiting the surface of said specimen, the improvement of a waveform function generator to correct the effects of external spurious electric fields which cause unwanted deflection of the beam, comprising; means to determine said spurious beam deflection at predetermined beam positions, means for generating beam scan correction signals complementary to said spurious beam deflection, means for applying said beam correction signals to said means for scanning said beam whereby said spurious beam scanning distortion deflection may be detected and a function correction to eliminate said distortion may be generated and applied to said scanning means to cause said beam to track over said specimen in substantially said predetermined raster pattern.

2. The improvement according to claim 1 wherein said means for scanning said beam includes means for deflecting said beam in substantially orthogonal directions and said means for generating a beam scan correction signal includes means for generating a deflection correction signal in at least one of said directions substantially equal and opposite said spurious beam deflection and means for superimposing said correction signal upon said means for deflecting said beam.

3. The improvement according to claim 2 wherein said means for generating a beam correction signal includes a means for identifying segments of said beam scan and means for generating a beam correcting signal for each segment of scan.

4. The improvement according to claim 3 wherein said means for applying said correction signals includes means for storing said correction signals for each segment of scan.

5. The improvement according to claim 4 wherein said means to apply said correction signals includes means to selectively apply said stored correction signals according to a predetermined sequence.

6. The improvement according to claim 5 wherein said recording means is a scanned display device the scan of which is synchronized with said beam deflection.

7. The improvement according to claim 6 wherein said scanned display device is a cathode ray tube.

8. The improvement according to claim 7 wherein said beam scan and said cathode ray scan are in a raster pattern of a plurality of horizontally disposed sweep lines arranged in a vertical array.

9. The improvement according to claim 8 includes means for dividing said array into a plurality of scan groups and means for generating a beam correction signal for each of the orthogonal directions of said beam deflection for substantially all of said scan groups and means for selectively applying said corrections to said beam deflection means as said beam is scanned through said groups.

10. The improvement according to claim 9 wherein said means for applying said correction signals is synchronized with said beam scanning means and said display device scan.

* * * * *